(12) United States Patent
Reilly

(10) Patent No.: US 6,901,672 B1
(45) Date of Patent: Jun. 7, 2005

(54) CALIPER GAUGE

(76) Inventor: Paul J. Reilly, 560 N. Moorpark Rd., No. 150, Thousand Oaks, CA (US) 91360

( * ) Notice: Subject to any disclaimer, the term of this patent is extended or adjusted under 35 U.S.C. 154(b) by 0 days.

(21) Appl. No.: 10/719,176

(22) Filed: Nov. 24, 2003

Related U.S. Application Data

(60) Provisional application No. 60/468,755, filed on May 8, 2003.

(51) Int. Cl.⁷ .............................. G01B 3/30; G01B 3/38

(52) U.S. Cl. ......................... 33/501.45; 33/562; 33/567

(58) Field of Search ............................ 33/501.45, 562, 33/567, 783

(56) References Cited

U.S. PATENT DOCUMENTS

| | | | | | |
|---|---|---|---|---|---|
| 741,146 | A | * | 10/1903 | Labofish | 33/562 |
| 2,536,401 | A | * | 1/1951 | Victor | 33/567 |
| 4,584,774 | A | * | 4/1986 | Link | 33/633 |
| 5,685,085 | A | * | 11/1997 | Bond | 33/562 |

* cited by examiner

*Primary Examiner*—Christopher W. Fulton
(74) *Attorney, Agent, or Firm*—Allen A. Dicke, Jr.

(57) ABSTRACT

The caliper gauge has a V-shaped gauge body. The V-shaped gauge body has stepped pairs of measuring surfaces both externally and internally of the V-shaped gage body. The pairs of measuring surfaces are a known distance apart for setting external and internal calipers. The gauge body may rest against a back plate, which prevents the caliper from being dislodged from the measuring surface. Indicia are provided for both the external measuring surfaces and internal measuring surfaces on the gauge body.

22 Claims, 5 Drawing Sheets

CALIPER GAUGE

CROSS REFERENCE

This application relies on provisional patent application, Ser. No. 60/468,755, filed May 8, 2003, for "Caliper Gauge" for priority.

FIELD OF THE INVENTION

Calipers of various types are used in woodworking shops and other trades and professions for setting dimensions. A caliper is adjust with respect to a measuring standard, and then the caliper is taken to the workpiece to determine if the workpiece is to size. The caliper gauge of this invention is for accurately setting a caliper to a specific dimension or accurately measuring the span of a previously set caliper.

BACKGROUND OF THE INVENTION

Calipers have been created in different configurations for different purposes. They have their use in a vast array of fields from architectural and engineering drafting to furniture making and measuring. They are used in machine-shop work and for measuring navigational maps and the like. The present method for measuring or setting a caliper is to lay it on a ruler and read the opening of the caliper against the ruler markings. This approach is very inaccurate, inconsistent and thus open to errors. A previously known device for setting outside calipers is called a "turning tree," which is a solid of revolution which has a plurality of decreasing cylinders of known diameters. Such a device is accurate when properly used, but it is difficult to assure that the caliper gauge tips are precisely set on the exact diameter. There is need for a gauge by which a caliper can be set accurately and accurately read.

SUMMARY OF THE INVENTION

In order to aid in the understanding of this invention, it can be stated in essentially summary form that it is directed to a caliper gauge which has a plurality of measuring surfaces which are accurately spaced from each other. Each pair of these measuring surfaces is at a known distance apart. Associated with each measuring surface are two stop surfaces. The back stop prevents the caliper from leaving the measuring surface in one direction, and the adjacent step face prevents the caliper from leaving the measuring surface in another direction so that the caliper gauge can be retained on the selected pair of measuring surfaces while the caliper is being adjusted.

It is, thus, a purpose and advantage of this invention to provide a caliper gauge which permits easy positioning of the caliper with respect to the gauge to hold the caliper in place while it is being adjusted.

It is another purpose and advantage of this invention to provide a caliper gauge which has a plurality of pairs of spaced measuring surfaces which are spaced a known distance and which have indicia related thereto so that the measurement therebetween can be quickly established.

It is another purpose and advantage of this invention to provide a caliper gauge of such construction that it can be placed on a base or secured against an upright so that it can be conveniently positioned adjacent to the place of desired measurement.

It is a further purpose and advantage of this invention to provide a caliper gauge which has two sets of pairs of measuring surfaces, with one set being positioned for inside measurement and the other set being positioned for outside measurement.

It is a further purpose and advantage of this invention to provide a simple and accurate caliper gauge for measuring and establishing the inside and outside measurement distances with any type of calipers.

Other purposes and advantages of this invention will be noted from the study of the following portion of the specification, the drawings and the attached claims.

DESCRIPTION OF THE PREFERRED EMBODIMENT

The caliper gauge of this invention is generally indicated at 10 in FIGS. 1 through 7. The caliper gauge is comprised of a back plate 12 which has a substantially planar front surface 14. As will be later described, the front surface 14 acts as a stop to aid in the placement of the caliper being set with respect thereto. The back plate may be rectangular, but it is preferably in the shape of an inverted V, as shown in FIGS. 1, 3, 5 and 7.

Figure 3:
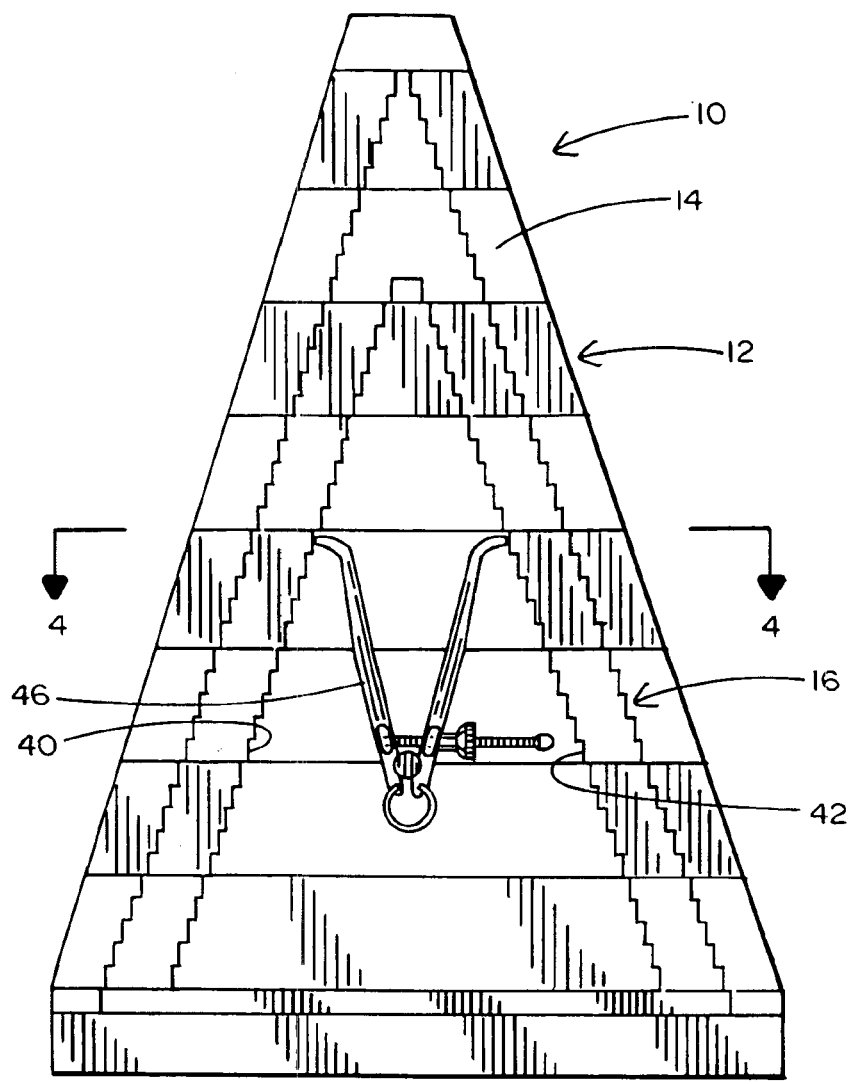
FIG. 3 is a front view thereof showing an inside caliper being set on the caliper gauge of this invention.
Figure 4:
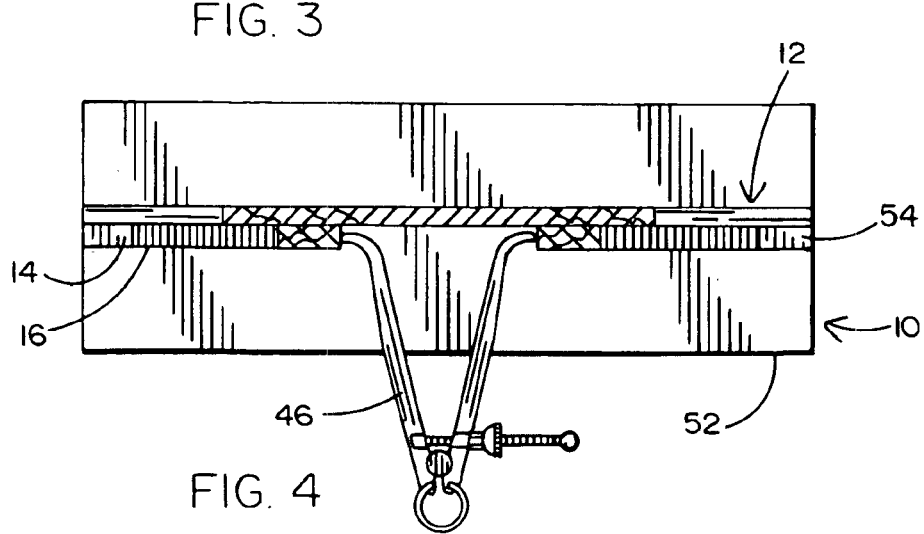
FIG. 4 is a downwardly looking section, taken generally along the line 4—4 of FIG. 3.
Figure 5:
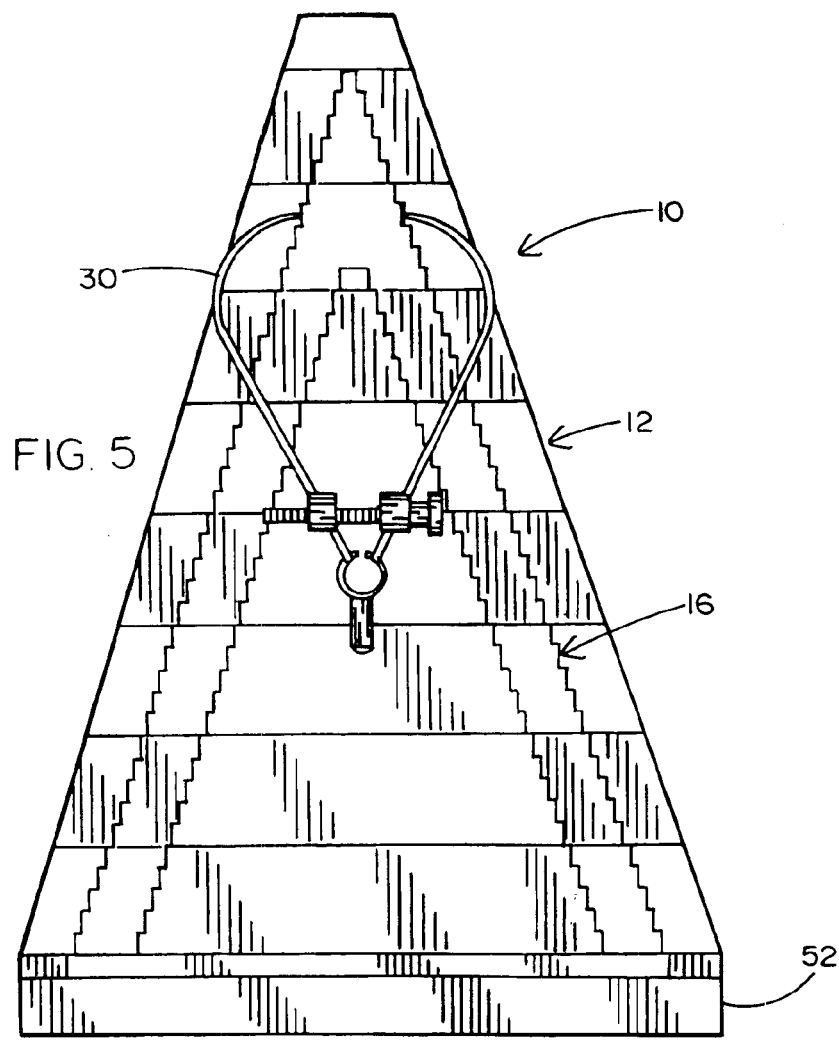
FIG. 5 is a front view showing an outside caliper being set on the caliper gauge of this invention.
Figure 6:
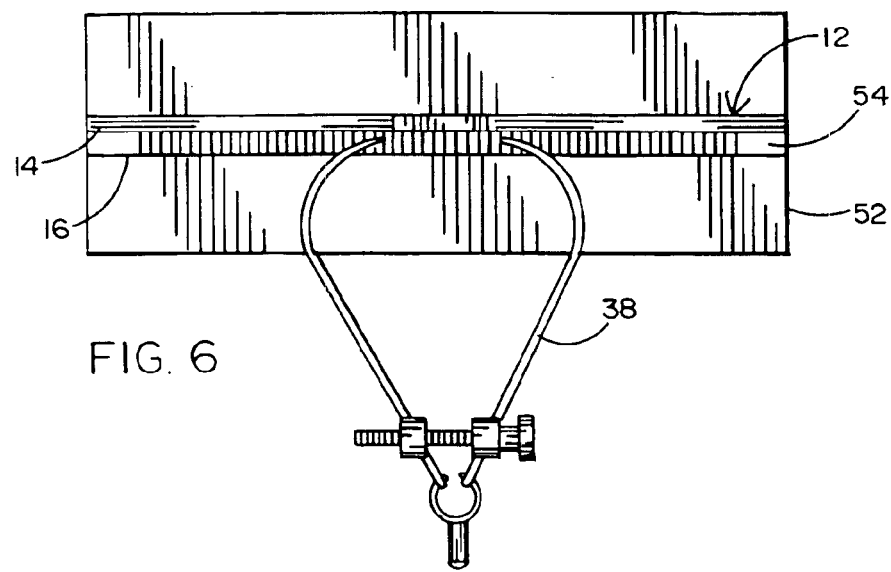
FIG. 6 is a top view of the structure of FIG. 5.
Figure 7:
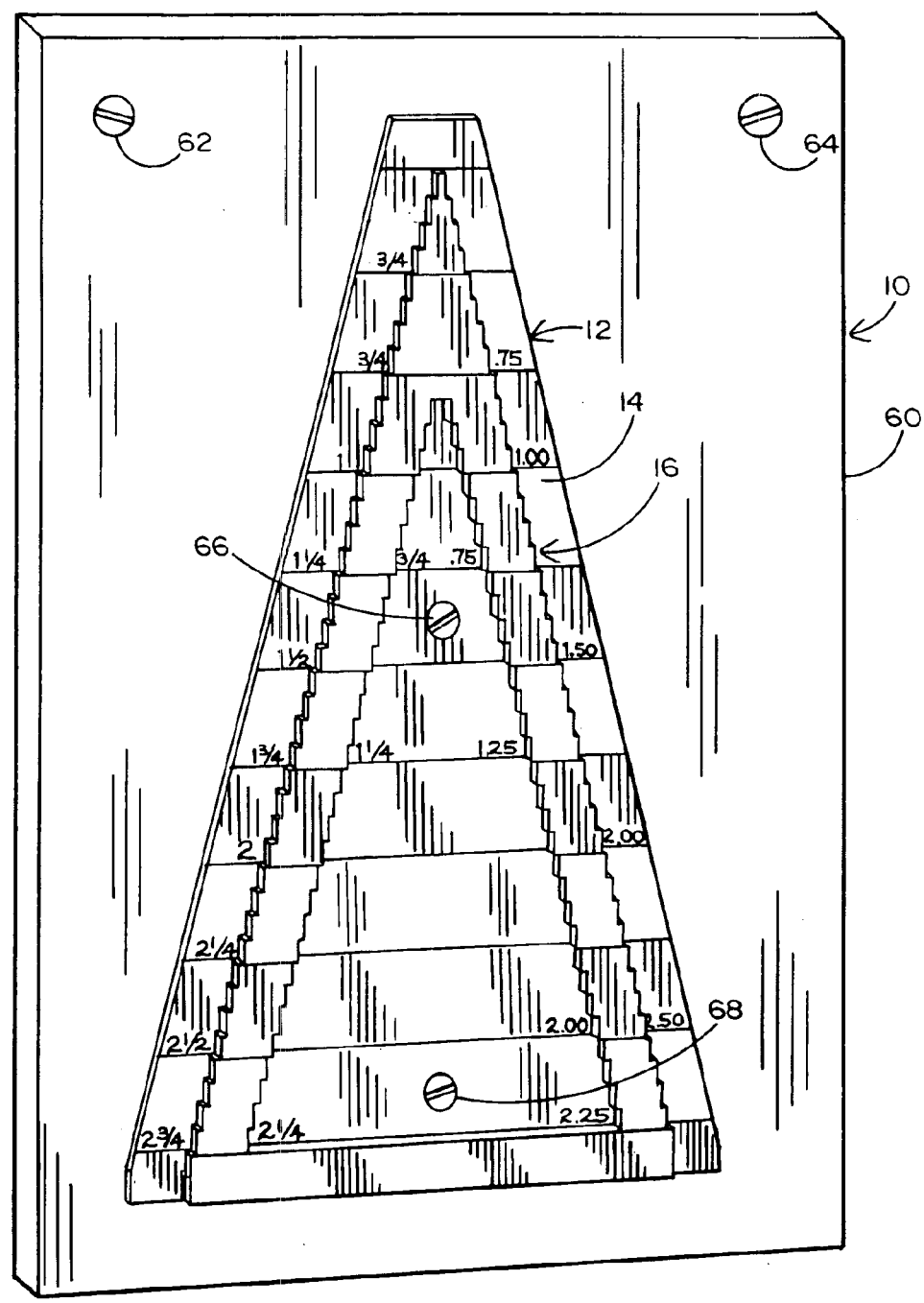
FIG. 7 is a view similar to FIG. 1 showing the caliper gauge mounted on a backboard.

Gauge body 16 is mounted on the front of the back plate. The gauge body 16 is in the form of an inverted V, but the inside and outside surfaces of the gauge body are in the form of stair steps. The stair steps are configured so that the lateral distance across the stair steps is a known value. It is these distances which are the reference distances to which the caliper gauge will be set. The gauge body 16 is seen to have these stair steps both on the inside and outside of the inverted V. FIGS. 3 and 4 show the inside stair steps are positioned to set an inside caliper. FIGS. 5 and 6 show how the outside stair steps are utilized to set an outside caliper. It is important to note that the step and gauge surfaces of each stair step plus the front of the back plate permit easy location of the fingers of the caliper. One cannot thrust these fingers too far back, beyond measuring range, because the back plate is present to limit position of the fingers in that direction. The adjacent step of the stair steps limits the caliper from being moved in the smaller direction for the inside caliper, see FIG. 3, and prevents it from moving in the larger direction for an outside caliper, as seen in FIG. 5. The caliper fingers are thus constrained by three different surfaces so that it is easy to properly position the caliper for its accurate setting.

In order to quickly identify the desired pair of gauge surfaces, the surfaces are marked in several ways. In the example shown in the drawings, the measurements are in the English system. The relationships could just as well be established in the metric system. There is a plurality of steps, and the distance across these steps successively increases by $1/16$ inch. The line 18, see FIG. 1, indicates that the gauge surfaces at that line are a pair of gauge surfaces. The indicia 20 shows that the measuring surfaces are $1/2$ inch apart. The indicia 22 indicates that the measuring surfaces are 0.50 inch apart. Thus, the indicia down the left side of the scale are in fractions, and the indicia down the right side are in 1/100 of an inch. As an example, measuring surfaces 24 and 26 are 1½ inches apart. The indicia "1½" are shown on the left side, and the indicia "1.50" is shown on the right side. The step faces 28 and 30 are directly below the measuring surfaces and lead to the next step, which is 1/16 inch wider.

The indicia 32 and 34 indicate that the measuring surfaces are 1½ inch apart, with suitable tolerances. The measuring surfaces directly thereabove are 1/16 inch closer and, thus, are 17/16 inches apart. The measuring surfaces directly below the surfaces 24 and 26 are 1/16 inch wider apart, and thus are 19/16 inches apart. This progression extends up and down the outside of the gauge body 16. Line 18 is the top indicator line, which visually aids in making sure that the proper pair of measuring surfaces is employed. Another of such indicator lines is indicated at 36 at the 1½ inch measuring surface. It is also seen that such indicator lines are presented across the back plate 12 and across the gauge body at each four measuring steps. Indicia may be applied wherever helpful to aid the artisan in selecting the correct pair of measuring steps. Other measuring step intervals than the measuring steps of this example which are progressively 1/16 inch larger than the previous pair of steps, can be utilized.

The indicator lines extending across the face of the back plate and across the face of the gauge body aid in selecting the desired pair of measuring surfaces. This arrangement is suitable for setting an outside caliper 38, as seen in FIGS. 5 and 6. The fingers of the caliper are placed on the larger step face adjacent the selected measuring surface. The fingers of the outside caliper are rested against the front surface 14 of the back plate. The caliper is then adjusted so that the fingers touch the selected measuring surfaces with the correct amount of resistance to achieve accurate setting of the caliper 38.

Figure 1:
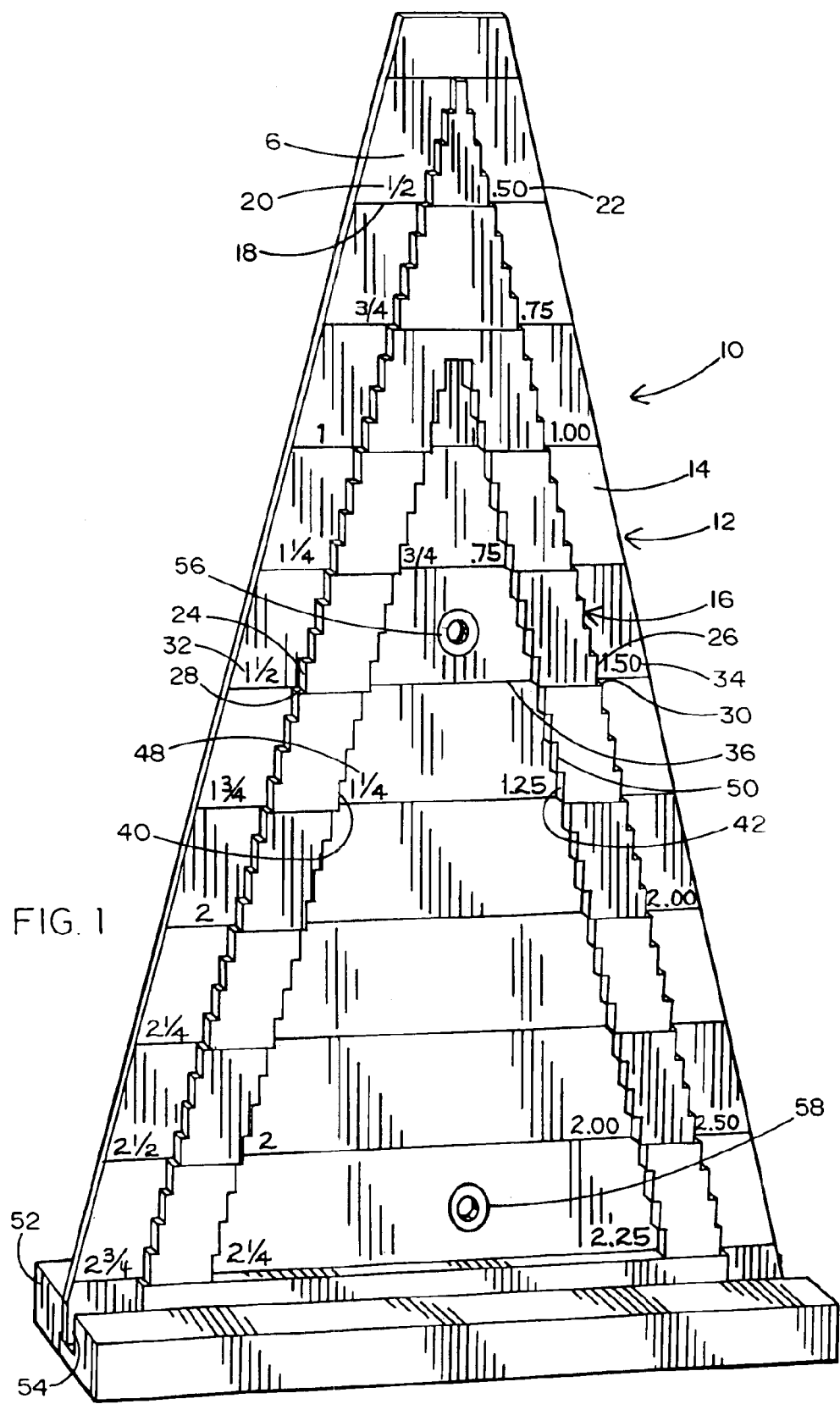
FIG. 1 is a perspective view from the front and slightly to the left and slightly above the caliper gauge of this invention.
Figure 2:
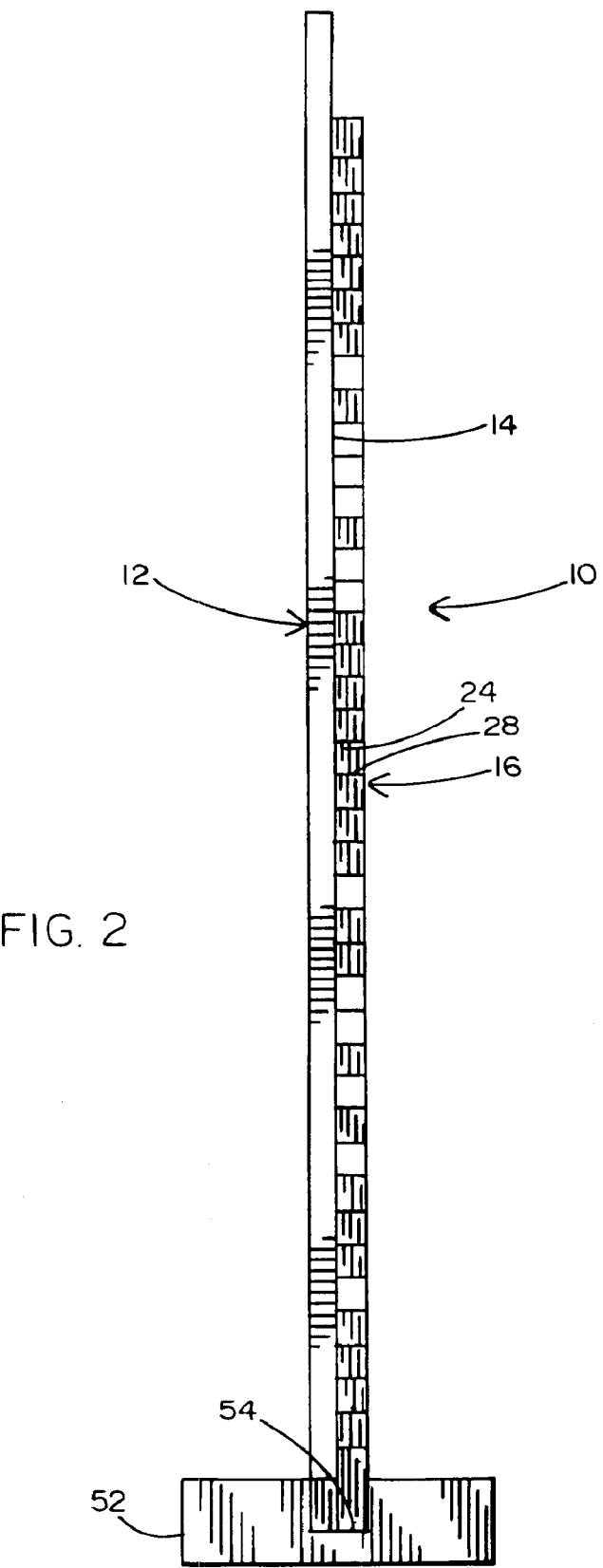
FIG. 2 is a left side view thereof.

In addition to the outside measuring surfaces just described, which are suitable for the setting of outside calipers, the gauge body is provided with a plurality of stepped inside measuring surfaces. These inside measuring surfaces face each other and are a known distance apart. Measuring surfaces 40 and 42 are shown in FIG. 1 as facing each other. These surfaces are in step relationship to a plurality of such pairs of measuring surfaces. Each of the pairs of measuring surfaces is a known distance apart so that an inside caliper 46 can be adjusted with respect thereto. The inside caliper 46 is shown in FIGS. 3 and 4. The measuring location is defined by these measuring surfaces, the adjacent step to the next smaller measuring surface and the front surface of the back plate. Thus, the fingers of the inside caliper 46 can be easily and securely engaged and retained on the selected pair of measuring surfaces. Indicia 48 and 50 shown in FIG. 1 indicate the dimension between these measuring surfaces. It is convenient to have the indicator lines 18 and 36 extend all the way across so that the selected pair of measuring surfaces can be more easily found.

In order to place the caliper gauge 10 at a location where it is convenient, it is provided with a base 52. The base 52 has a slot 54 therein which is sized to receive the back plate and gauge body. The base is sufficiently wide to permit the caliper gauge to stand upright, as seen in FIG. 1. For an additional mounting opportunity, the back plate 12 has screw holes 56 and 58 therein. This permits the back plate with its gauge body to be attached to a back board 60 shown in FIG. 7. The back board 60 may be attached to a wall or post by means of screws 62 and 64. As an alternative to the back board 60, the back plate 12 and gauge body can be attached directly to a post, a machine tool or to the end of a tool box by means of screws 66 and 68. Thus, it is clear that the caliper gauge 10 provides an easily used caliper setting tool which can be placed or secured conveniently to the function at which calipers need to be quickly and accurately set.

This invention has been described in its presently preferred embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A caliper gauge comprising:

first and second substantially parallel measuring surfaces spaced from each other at a substantially known distance, a first step face intersecting said first measuring surface and a second step face intersecting said second measuring surface, said step faces acting as caliper gauge stops to aid in positioning the fingers of a caliper gauge on said first and second measuring surfaces; and a back stop having a back stop surface, said back stop surface intersecting said first measuring surface and said second measuring surface, said back stop surface being for further aid in positioning caliper gauge fingers against first and second measuring surfaces.

2. The caliper gauge of claim 1 wherein said first and second measuring surfaces is a pair of measuring surfaces at a substantially known distance from each other and there is a plurality of such pairs of measuring surfaces on said caliper gauge.

3. The caliper gauge of claim 2 where said first and second step faces adjacent said first and second measuring surfaces are steps between adjacent measuring surfaces.

4. The caliper gauge of claim 1 wherein said first and second measuring surfaces face away from each other and said caliper gauge also has third and fourth measuring surfaces facing toward each other, said third and fourth measuring surfaces each also having an adjacent step face and said back stop surface to aid in positioning the fingers of the caliper with respect to said third and fourth measuring surfaces.

5. The caliper gauge of claim 4 wherein said first and second measuring surfaces is a pair of measuring surfaces at a substantially known distance from each other and there is a plurality of such pairs of measuring surfaces on said caliper gauge.

6. The caliper gauge of claim 5 where said first and second step faces adjacent said first and second measuring surfaces are steps between adjacent measuring surfaces.

7. The caliper gauge of claim 6 wherein said measuring surfaces are formed on a gauge body and said back stop surfaces are all on said back stop, said gauge body lying against said back stop.

8. A caliper gauge comprising:

a back plate having a front surface;

a gauge body, said gauge body lying against said front surface of said back plate, said gauge body having a plurality of pairs of measuring surfaces, each of said pairs of measuring surfaces comprising a first measuring surface and a second measuring surface, said first and second measuring surfaces of each pair being substantially parallel and being spaced apart a substantially known distance, said gauge body having step faces between said pairs of measuring surfaces so that a caliper gauge can have its fingers placed on said first and second measuring surfaces of a particular pair of measuring surfaces with the fingers of said caliper gauge being positioned with respect to said measuring surfaces by said front surface of said back plate and said adjacent step face.

9. The caliper gauge of claim 8 wherein said gauge body is V-shaped and said pairs of measuring surfaces are external of said V for the setting of an external caliper and there are also pairs of measuring surfaces on the inside of said V, said inside measuring surfaces each lying adjacent a step face and said front surface on said back plate so that an internal caliper can be set with its fingers on said inside measuring surfaces.

10. The caliper gauge of claim 9 wherein there is indicia adjacent selected ones of pairs of measuring surfaces to aid in selecting the desired pair of measuring surfaces.

11. The caliper gauge of claim 8 wherein there is indicia adjacent selected ones of pairs of measuring surfaces to aid in selecting the desired pair of measuring surfaces.

12. The caliper gauge of claim 11 wherein said indicia is positioned on said back plate.

13. The caliper gauge of claim 11 wherein said indicia is positioned both on said back plate and on said gauge body.

14. The caliper gauge of claim 8 further including a base, said back plate and said gauge body being supported by said base so that said caliper gauge can stand on any surface.

15. The caliper gauge of claim 8 wherein said back plate has attachment structure thereon so that said back plate can be attached an upright structure to position said caliper gauge in a convenient location.

16. A caliper gauge comprising:
a gauge body, a back plate having a front surface, said gauge body being attached to said front surface of said back plate;
a plurality of pairs of measuring surfaces on said gauge body, said measuring surfaces of each of said pairs of measuring surfaces being spaced from each other a substantially known distance, a first pair of said measuring surfaces being positioned adjacent a second pair of said measuring surfaces which are a different distance apart so that said gauge body has a step face between said first and second pairs of measuring surfaces so that each pair of measuring surfaces lies adjacent said front surface of said back plate and said adjacent step face so that the fingers of a caliper are constrained with respect to a particular selected pair of measuring surfaces.

17. The caliper gauge of claim 16 wherein said pairs of measuring surfaces are positioned with respect to each other as to be in a successively larger spacing between said measuring surfaces.

18. The caliper gauge of claim 17 wherein said measuring surfaces include pairs of outside measuring surfaces which face away from each other and pairs of inside measuring surfaces which face toward each other, with the measuring surfaces of each pair of measuring surfaces being substantially parallel to each other.

19. The caliper gauge of claim 18 further including indicia to permit the user to easily select the pair of measuring surfaces which are at a selected distance from each other.

20. The caliper gauge of claim 19 further including structure to support said caliper gauge at a desired location.

21. A caliper setting gauge comprising:
a unitary gauge body, said unitary gauge body being V-shaped, said unitary gauge body having a plurality of internal pairs of flat measuring surfaces and a separate plurality of pairs of external flat measuring surfaces, said pairs of measuring surfaces which are external of said V-shaped unitary gauge body facing away from each other and being for the setting of an external caliper and said pairs of measuring surfaces on the inside of said V-shaped unitary gauge body facing each other and being for the setting of an internal caliper, each of said pairs of measuring surfaces comprising a first measuring surface and a second measuring surface, said first and second measuring surfaces of each pair being substantially parallel and being spaced apart a substantially known distance, said gauge body having step faces between said pairs of measuring surfaces, said step faces of a pair of measuring surfaces being in line with each other so that a caliper gauge can have its fingers placed on said first and second measuring surfaces of a particular pair of measuring surfaces with the fingers of said caliper gauge being positioned with respect to said measuring surfaces by said adjacent step face.

22. The caliper setting gauge of claim 21 wherein there is indicia adjacent selected pairs of measuring surfaces to aid in selecting the desired pair of measuring surfaces.

* * * * *